United States Patent [19]

Dickey et al.

[11] 4,339,882

[45] Jul. 20, 1982

[54] ORGANIC SOLID SUBSTRATE DEWATERING PROCESS UTILIZING PRIMARY AND SECONDARY SOLVENTS

[75] Inventors: Leland C. Dickey; Maya Tayter, both of Omaha, Nebr.

[73] Assignee: InterNorth, Inc., Omaha, Nebr.

[21] Appl. No.: 280,264

[22] Filed: Jul. 2, 1981

[51] Int. Cl.³ .............................................. F26B 3/00
[52] U.S. Cl. ........................................... 34/9; 44/27
[58] Field of Search .................. 34/9; 44/10 D, 10 E, 44/10 J, 27

[56] References Cited

U.S. PATENT DOCUMENTS

| 3,327,402 | 6/1967 | Lamb et al. | 34/9 |
| 3,653,983 | 4/1972 | Ziehr et al. | 34/9 |
| 4,014,104 | 3/1977 | Murphy | 34/9 |
| 4,212,112 | 7/1980 | LaDelfa | 34/12 |
| 4,223,449 | 9/1980 | Bodle et al. | 34/9 |
| 4,238,067 | 12/1980 | Osmotherley | 34/9 |

*Primary Examiner*—John J. Camby
*Attorney, Agent, or Firm*—Donald F. Haas

[57] ABSTRACT

A method of removing water from organic solid substrates, such as peat, wherein a primary solvent is used to extract water from the substrate and a secondary solvent is used to separate the primary solvent from the water.

6 Claims, No Drawings

ORGANIC SOLID SUBSTRATE DEWATERING PROCESS UTILIZING PRIMARY AND SECONDARY SOLVENTS

BACKGROUND OF THE INVENTION

This invention relates to a method for dewatering or drying organic solid substrates which contain a large amount of water. The method has specific relevance with respect to fossilized biomass materials such as peat and coal but also has application with respect to various other biomass substrates such as agricultural and forestry residues (bagasse, corn stover, saw dust, etc.), crops deliberately grown for their fuel or chemical value, and sewage sludge. The present invention provides a heat-efficient method for removing water from such materials prior to the conversion of the solid to a more valuable product.

Peat and certain other organic solid substrates contain substantial amounts of water. It is known that peat can contain up to 90 percent or more water, by weight, and this has been the major deterrent to its wider use as a fuel source. It is desired to use peat and some other biomass substrates as fuel sources by direct combustion or by high temperature conversion to a more convenient fuel such as a fuel gas. As much of the water as possible must be removed from these materials prior to conversion since much of their potential heating value would otherwise be consumed in the evaporation of the water contained therein. For example, when peat is burned directly, much of the heat generated must be used to evaporate the water originally present in the peat. As a result, the temperature produced by combustion is low and the efficiency of combustion heat transfer is greatly reduced. These disadvantages cannot be overcome by merely heating the peat to evaporate the water prior to combustion because the same heat and cost inefficiencies would result, unless, of course, the heat was free such as "field drying". However, this leads to other problems such as containing the dried material when it is dispersed widely over the landscape.

U.S. Pat. No. 3,327,402, issued June 27, 1967, describes a process for drying coal fines at low temperatures by contacting them with a volatile low molecular weight solvent such as methanol in which water is highly soluble at low temperatures to remove the water from the coal fines. The coal fines are heated to remove the volatile solvent and the solvent is recovered from the water-solvent mixture by distillation. U.S. Pat. No. 4,014,104, issued Mar. 29, 1977, discloses a method of drying a moist particulate carbonaceous material, which may be peat, by adding methanol to the material followed by application of heat to remove both the solvent and water from the materal. Again, the solvent is separated from the water by distillation. Neither of these patents discloses the use of a secondary solvent to separate the primary solvent from the water.

U.S. Pat. No. 4,212,112, issued July 15, 1980, discloses a method for drying solid carbonaceous materials wherein they are mixed with benzene to form a constant boiling mixture of water and benzene which is not susceptible to composition change except by evaporating enough of the mixture so as to consume one constituent. The water and benzene are separated by heating the mixture until the benzene is completely vaporized. The condensed vapor forms two phases which are easily separable. U.S. Pat. No. 4,223,449, issued Sept. 23, 1980, discloses a heat-efficient method for dewatering solids such as peat whereby the solids are contacted with a liquid solvent such as benzene or toluene at a high temperature, the solids are removed, and the liquid stream is cooled to a lower temperature, less than 150° F., thereby causing the water to separate from the solvent as a separate phase. Neither of these patents disclose the use of a secondary solvent to separate the primary solvent from the water which it removes from the carbonaceous material.

It is an object of this invention to provide an energy and cost-efficient method of removing water from organic solid substrates such as peat by means of a primary solvent which removes the water from the substrate and a secondary solvent which separates the primary solvent from the water. This eliminates the need for energy and cost inefficient methods of separating the primary solvent from the water such as distillation. The secondary solvent is chosen so that it can be easily and cheaply separated from the primary solvent.

SUMMARY OF THE INVENTION

The present invention relates to a method of removing water from organic solid substrates such as peat, coal, conventional biomass materials, municipal trash, and sewage. The method comprises contacting the substrate with a primary solvent to remove at least a large portion of the water therefrom, separating the substrate from the mixture of primary solvent and water, contacting the mixture with a secondary solvent which is miscible with the primary solvent but not with water, thereby separating the primary solvent from the water. Finally, the primary and secondary solvents are separated according to known techniques in the art. The two types of solvents are chosen so that they can be easily separated in an energy and cost-efficient manner.

The primary solvent can be selected from the group consisting of alcohols, ketones, aldehydes, ethers, carboxylic acids and esters thereof, amines, and amides. Additionally, acetonitrile, various imines, azirane, azetidine, and other liquids that are infinitely miscible with water can also be used as the primary solvent. The secondary solvent is selected from the group consisting of 1-decanol, octanol, linoleic acid, tributyl phosphate and ethyl benzene. For best results, a weight ratio of primary solvent to water of 1:2 to 4:1 should be used to extract the water from the organic solid substrate and a weight ratio of primary solvent to secondary solvent of 2:1 to 1:2 should be used in the separation of the water from the mixture of primary solvent and water.

DETAILED DESCRIPTION OF THE INVENTION

The present invention relates to an energy and cost-efficient method of removing water from organic solid substrates, especially peat, coal, and biomass materials. These solids commonly have a high moisture content which must be reduced before they can be efficiently used as a fuel source, a chemical source, or disposed of, as the case may be.

In the method of this invention, the organic solid is first contacted with a primary solvent which removes at least a large portion, if not all, of the water contained in the substrate. For best results, the weight ratio of primary solvent to water should be 1:2 to 4:1. If the ratio is less than 1:2, then insufficient water will be removed for most conversion processing and the ratio of more than 4:1 is not necessary because an excessive amount of mixture separation and solvent recirculation is necessary.

The next step is separating the solid from the mixture of primary solvent and water. This can be accomplished by any convenient means such as draining or pressing which may be easier after the addition of the solvent because of disruption of the solid/water structure as disclosed in U.S. Pat. No. 4,014,104. The preferred method is draining and then pressing because that gives a good substrate for further processing but it depends on the particular final product desired. The residual methanol in the substrate can be removed by any convenient method such as evaporation.

The third step is contacting the mixture of primary solvent in water with a secondary solvent. The secondary solvent must be miscible with the primary solvent and preferably not with water. For best results, the weight ratio of primary solvent to secondary solvent should be 2:1 to 1:2 per stage. If the ratio is less than 1:2, then an excessive number of stages will be needed, and if the ratio is more than 2:1, then an excessive amount of secondary solvent is necessary. When the three components are in the correct proportions, two phases will result. One will be mostly water and the other will be a mixture of primary solvent and secondary solvent.

The two phases are separated in a settling vessel using the density difference of the phases. Finally, the primary and secondary solvents are separated. They are chosen such that this separation can be accomplished in an energy and cost-efficient manner. Preferred methods for accomplishing this separation are distillation or freezing depending on the particular solvents selected.

The primary solvent may be any liquid compound, preferably an organic compound, which is miscible with water, will not dissolve the biomass substrate from which the water is being removed, and which is miscible with the secondary solvent preferentially to water. The following compounds are suitable for extracting water from biomass substrates including peat and sewage sludge. The list is representative and many compounds by way of substituent additives or isomeric variation are also suitable. Expensive, corrosive, or foul-smelling compounds have not been included even though some of them might be usable with sufficiently restricted reactor designs.

Alcohols are especially suitable for use at the primary solvent in the present invention. Monohydroxy, $C_1$ to $C_{20}$, dihydroxy $C_2$ to $C_5$ including glycols such as ethylene glycol and propylene glycol, and trihydroxy $C_3$ to $C_5$ are all suitable compounds. Generally, as the chain length is increased, more hydroxy or other polar substituent groups are required to achieve miscibility with water. Ketones are also suitable for use as the primary solvent. Various $C_2$ to $C_4$ ketones such as acetone, diacetone, alcohol, and 3-hydroxy-2-butanone are examples of such compounds. Aldehydes can also be used. $C_2$ to $C_4$ aldehydes such as 3-hydroxybutanol and 1-aminobutanol are suitable. Straight chain and ring compound ethers are suitable as the primary solvent also. $C_4$ to $C_8$ ethers such as dioxane, dioxolane, morpholine, diethylene monobutyl ether, 1-hydroxylactone, dimethyloxazole, butyrolacetone, valerolactone, and pentenoic acid 4-hydroxylactone are suitable examples. Carboxylic acids, especiallay $C_1$ to $C_7$ acids such as formic and acetoacetic acids can be used. Straight, ring and multiple ring amine compounds can be used because of the polar nature of nitrogen. The preferred amines are $C_2$ to $C_5$ such as benzylamine N-acetylethanolamine, t-butyl amine, diethylenetriamine, allylmethylamine, ketine, 3-methylpyrazole, diazine and pyrrolidine. There are a large number of amides which can be used because the polar nature of the nitrogen and oxygen atoms permit compounds with a larger molecular size to maintain water miscibility. Amides containing 1 to 8 carbon atoms are particularly suitable, for example, 2, 4-dinitroacetanilide and N,N-dimethylpentenoic acid amide. A wide variety of carboxylic acid esters can also be used. They follow the same pattern as that of the amides. Examples of such compounds are ethylglycinate, tetrahydrofurfuryl acetic acid ester and carbitol acetate. In addition to the above, there are a small number of compounds which are not represented by a substantial class. Examples are acetonitrile, various imines, azirane and azetidine. It should be noted that the preferred solvents for use in the present invention are methanol, ethanol and propanol because of their low cost and availability.

The secondary solvent must have the following characteristics: miscibility with the primary solvent, immiscibility with water, and easy separability from the primary solvent. There are a great many compounds which satisfy these three criteria. These can be established by experimentation or it can be predicted using a group contribution model such as discussed in "Group-Contribution Estimation Of Activity Coefficients In Non-Ideal Liquid Mixtures", *AIChE Journal*, Volume 21, No. 6, pages 1086–1099 and "A Group Contribution Molecular Model of Liquids and Solutions", *AIChE Journal*, Volume 23, No. 2, pages 144–160. These models allow the predication of the behavior of liquid mixtures by combining the effect of the chemical groups present in the mixture. Five main groups ($CH_3$, $CH_2$, CO, OH and $H_2O$) and their interactions have been characterized using property measurements of a number of pure compounds and mixtures. The preferred secondary solvent is 1-decanol, but octanol, linoleic acid, and tributyl phosphate, among others, are also very suitable for use in the present invention.

The primary and secondary solvents may be separated by any convenient method. It is preferred that the method be both energy and cost-efficient. Freeze separation is one such method. In this method, the mixture would be fed to a chilled vessel and the solvent with the higher fusion temperature frozen and separated by conventional means. Another suitable method of separation is parametric pumping (cyclic circulation through a packed column which is selectively adsorptive and whose selectivity can be altered by changing an intensive column parameter).

After the mixture of primary solvent and water is removed from the biomass substrate, there is likely to be a residual amount of primary solvent remaining in the substrate. If it is desired, this material can be removed from the substrate by any convenient method such as evaporation or pressing, if possible.

EXAMPLE I 100 grams of peat containing 77 percent water is contacted with 200 grams of methanol in a 4 centimeter diameter column. The packing density of the moist peat is 0.75 grams per cubic centimeter. The methanol is then allowed to elute for one hour. After that time, the solid in the column consisted of 23 grams of peat solids, 23 grams of water, and 150 grams of methanol. The methanol is then removed by mechanically pressing it from the peat and evaporating the remaining amount to give a peat product containing 50 percent moisture.

The liquid eluent is collected in two batches. The batch from the first 6 minutes is 27 grams consisting of 88 percent water. The water and the methanol are separated by simple means such as freezing. The next 13 minute fraction contains 48 grams of a mixture of 69 percent water and 31 percent methanol. This fraction is mixed with 96 grams of 1-decanol, vigorously agitated, and allowed to settle. Two phases of approximately 33 to 26 weight ratio form in the mixture. The 1-decanol (or extract) phase is the larger phase and is comprised 88.5 percent 1-decanol, 4 percent water, and 7.5 percent methanol. The raffinate phase is comprised of 73 percent water, 26.5 percent methanol, and 0.5 percent decanol.

The extract phase is then separated to pure components by evaporation of the methanol. Once the methanol is gone, the 1-decanol and the water form two distinct phases. The raffinate phase containing the bulk of the water is introduced to further 1-decanol treatment stages and the water content increased by continually recycling the raffinate phase until a water phase suitable for freeze separation is produced.

EXAMPLE II

Serveral experiments were performed with mixtures of water, methanol, and various secondary solvents. In all cases, the three components were mixed together, vigorously agitated, and allowed to settle, usually for 4 or 5 hours. In the case of linoleic acid, the mixture was allowed to settle for 48 hours and it still was not completely settled. This is because the densities of the two phases are very close together. All of the extractions were carried out at room temperature and ambient pressure.

The results for linoleic acid are shown in Table I, those for 1-decanol in Table II, for 2-octanol in Table III, and for tributylphosphate in Table IV. It can be seen in all cases for all ratios of the components used, that the extraction increases the percentage of the water compared to the methanol in the raffinate phase from what it was in the original mixture. Thus, it can be seen that the secondary solvent method allows the separation of water from methanol in a relatively energy and cost-efficient manner.

TABLE 1

| Ratio* | Components Wh. % | Water | Methanol | Linoleic Acid |
|---|---|---|---|---|
| | The original mixture | 10 | 23.4 | 66.6 |
| 1/2 | Raffinate** | 36.3 | 43.7 | 20.0 |
| | Extract*** | 4.2 | 9.8 | 86.0 |
| | The original mixture | 15.0 | 35.0 | 50.0 |
| 1/1 | Raffinate | 31.6 | 48.4 | 20.0 |
| | Extract | 5.6 | 9.4 | 85.0 |
| | The original mixture | 20.0 | 46.7 | 33.3 |
| 2/1 | Raffinate | 26.5 | 55.5 | 18.0 |
| | Extract | 9.2 | 3.8 | 87.0 |

*Ratio - H₂O + MeOH:Linoleic acid
**Raffinate - Residual liquid (H₂O) from which methanol has been removed
***Extract - Solvent (linoleic acid) - rich product

TABLE 2

| Ratio H$_2$O + MeOH: Decanol | | Water Wt. % | Components Methanol Wt. % | Decanol Wt. % |
|---|---|---|---|---|
| | The original mixture | 24.9 | 25.2 | 49.9 |
| 1/1 | Raffinate | 57.0 | 42.2 | 0.8 |
| | Extract | 7.1 | 15.6 | 77.3 |
| | The original mixture | 33.4 | 33.4 | 33.2 |
| 2/1 | Raffinate | 53.3 | 46.0 | 0.7 |
| | Extract | 7.8 | 17.3 | 74.9 |

TABLE 3

| Ratio H$_2$O + MeOH: Octanol | | Water Wt. % | Components Methanol Wt. % | Octanol Wt. % |
|---|---|---|---|---|
| | The original mixture | 25.0 | 24.9 | 50.1 |
| 1/1 | Raffinate | 58.6 | 39.4 | 2.0 |
| | Extract | 9.3 | 18.0 | 72.7 |
| | The original mixture | 33.2 | 33.2 | 33.6 |
| 2/1 | Raffinate | 53.0 | 44.2 | 2.8 |
| | Extract | 12.5 | 21.7 | 65.8 |

TABLE 4

| Ratio H$_2$O + MeOH: TBP | | Water Wt. % | Components Methanol Wt. % | TBP Wt. % |
|---|---|---|---|---|
| | The original mixture | 25.0 | 25.0 | 50.0 |
| 1/1 | Raffinate | 58.6 | 38.0 | 3.4 |
| | Extract | 10.0 | 19.0 | 71.0 |
| | The original mixture | 33.4 | 33.5 | 33.1 |
| 2/1 | Raffinate | 52.8 | 43.0 | 4.2 |
| | Extract | 10.9 | 22.0 | 67.1 |

We claim:

1. A method of removing water from organic solid substrates which comprises:
   (a) contacting the substrate with a primary solvent to remove at least a large portion of the water therefrom,
   (b) separating the substrate from the mixture of primary solvent and water,
   (c) contacting said mixture with a secondary solvent which is miscible with the primary solvent but not with water to separate the primary solvent from the water,
   (d) separating the water from the mixture of primary solvent and secondary solvent, and
   (e) separating the primary and secondary solvents.

2. The method of claim 1 wherein the primary solvent is selected fromth group consisting of alcohols, ketones, aldehydes, ethers, carboxylic acids and esters of carboxylic acids, amines, amides, imines, acetonitrile, azirane, azetidine, and other liquids having infinite water miscibility.

3. The method of claim 1 wherein the weight ratio of primary solvent to water in step (a) is 1:2 to 4:1.

4. The method of claim 1 wherein the weight ratio of primary solvent to secondary solvent in step (c) is 2:1 to 1:2.

5. The method of claim 1 wherein the secondary solvent is selected from the group consisting of 1-decanol, octanol, linoleic acid, tributyl phosphate, and ethyl benzene.

6. The method of claim 1 wherein the organic solid substrate is peat.

* * * * *